United States Patent

Main

[11] 4,217,003
[45] Aug. 12, 1980

[54] WHEEL TRIM ATTACHMENT

[75] Inventor: John A. Main, Plymouth, Mich.

[73] Assignee: Kelsey Hayes Co., Romulus, Mich.

[21] Appl. No.: 80,102

[22] Filed: Oct. 1, 1979

Related U.S. Application Data

[63] Continuation-in-part of Ser. No. 895,213, Apr. 10, 1978, abandoned, which is a continuation of Ser. No. 701,640, Jul. 1, 1976, abandoned.

[51] Int. Cl.³ .......................... B60B 7/02; B60B 7/06
[52] U.S. Cl. ................................. 301/37 S; 301/37 P; 301/108 S
[58] Field of Search .................. 301/37 R, 37 P, 37 S, 301/37 TP, 37 PB, 108 R, 108 S, 108 A, 9 DN

[56] References Cited

U.S. PATENT DOCUMENTS

| | | | |
|---|---|---|---|
| 2,217,086 | 10/1940 | Whitacre | 301/37 R |
| 2,819,929 | 1/1958 | Hunt | 301/108 R |
| 3,202,460 | 8/1965 | Holbrow | 301/37 S |

FOREIGN PATENT DOCUMENTS

| | | | |
|---|---|---|---|
| 2447575 | 4/1976 | Fed. Rep. of Germany | 301/37 P |
| 1101138 | 4/1955 | France | 301/37 TP |

*Primary Examiner*—Charles A. Marmor
*Attorney, Agent, or Firm*—Ralph J. Skinkiss

[57] ABSTRACT

A trim attachment for a motor vehicle wheel includes a plurality of generally conical retention members which engage and secure the trim attachment directly to complementary conical surfaces on conventional threaded lug nuts utilized to retain the wheel in the vehicle. The retention members are spaced about the trim attachment in a pattern corresponding to that of the wheel lug nut. The members include a central conical surface which engages the conical portion of the lug nut, a stop structure positioned uniformly at one end of each conical surface which engages the body of the lug nut, a resilient camming structure disposed uniformly at the other end of each conical surface which resiliently engages the conical surface of a lug nut and a free standing triangular tab adjacent the camming surface and pointing away therefrom which guides and engages the trim attachment onto the lug nuts.

11 Claims, 6 Drawing Figures

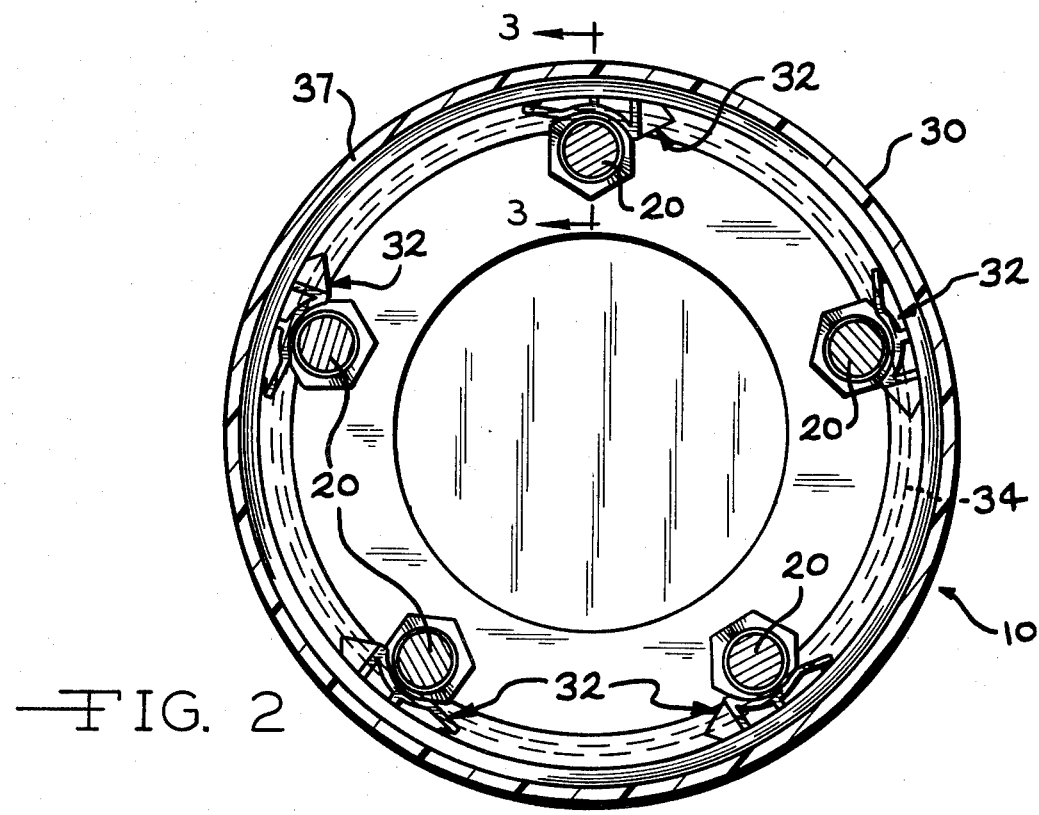
FIG. 2
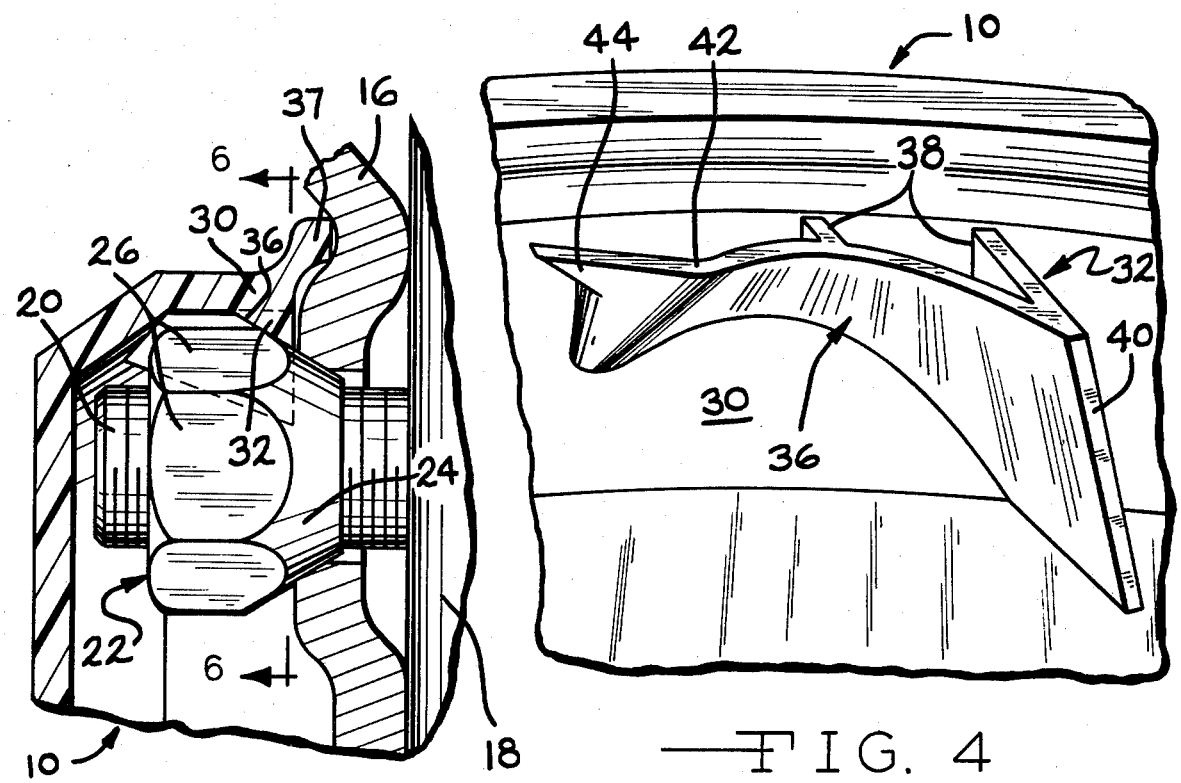
FIG. 3
FIG. 4

WHEEL TRIM ATTACHMENT

This application is a continuation in part of my co-pending application Ser. No. 895,213, filed Apr. 10, 1978 now abandoned, which was a continuation of my application, Ser. No. 701,640 filed July 1, 1976 now abandoned.

BACKGROUND OF THE INVENTION

This invention relates to a wheel trim attachment and more particularly to an improved wheel trim attachment which secures directly to the inwardly directed conical surfaces of conventional wheel lug nuts.

It is common practice to utilize one or more trim components which are removably secured to a vehicle wheel to improve its appearance. Trim components such as wheel covers, hub caps, trim rings and simulated wire wheels are commonly utilized in this fashion. A conventional vehicle wheel is fabricated of an outer annular portion or rim upon which the tire is seated and an inner radial disc or spider secured to the rim and mounted upon the vehicle. In order to provide attachment means for a conventional hub cap or wheel cover, the spider is formed with a plurality of protrusions or a ridge adjacent the rim. Fabrication of spiders including either of these trim attachment features present several difficulties. The ridge and protrusions may require additional stamping or forming operations and generally add to the complexity and cost of the spider. Thus, many structural and cost advantages could be achieved if it were unnecessary to form these trim attachment features in the wheel spider.

There have been several attempts to devise wheel trim mounting means which do not require special spider constructions but which attach to some other portion of the wheel or wheel assembly. U.S. Pat. No. 2,217,086 to C. J. Whittaker utilizing an inwardly directed notched flange which engages the wheel lug nut is such an attempt. U.S. Pat. No. 2,819,929 to J. H. Hunt discloses a wheel trim attachment incorporating a convoluted spring which secures in a similar manner.

While the devices disclosed in these patents provided once timely solutions to this problem, they are not so elegant when compared to contemporary requirements. The increased emphasis on improved gas mileage due to the federal corporate average fuel economy (CAFE) standards has brought about new emphasis on weight and energy saving automobile componentry. Such emphasis has increased research and design efforts into single-piece plastic parts molded of acrylonitrile-butadiene-styrene (ABS) and other plastics. Weight and material savings in the drive train are especially significant inasmuch as any weight reduction not only lowers the overall weight of the vehicle but, since it is a rotating component, also minimizes energy losses associated with the rotational acceleration and deceleration of the component part.

SUMMARY OF THE INVENTION

The dual considerations of reduced energy consumption and use of high-strength, lightweight plastic combine in the instant invention. The wheel trim attachment of the instant invention is a single-piece molded plastic hub incorporating a plurality of trim retention members which cooperate with and engage to the conical surfaces of conventional lug nuts. the retention members are spaced about the inside of the trim attachment in a pattern which corresponds to that of the wheel bolts and lug nuts. These structures include a central conical portion which engages the correspondingly angled conical portion of the lug nut. At the same end of each conical surface is a terminal structure which extends generally inwardly from the conical surface and engages the body of the lug nut. Adjacent the other end of each conical surface is a resilient camming structure which flexes to allow installation and removal of the trim attachment and which resiliently engages the conical surface of the lug nut. A free-standing generally triangular tab adjacent the camming surface and pointing away therefrom guides the trim attachment and retention members into proper pre-installation position on the lug nuts.

It is thus an object of the instant invention to provide a wheel trim attachment which secures directly to the lug nuts of a motor vehicle wheel.

It is a further object of the instant invention to provide a wheel trim attachment which does not require the fabrication of protrusions and ridges on the spider of the vehicle wheel as trim attachment means.

It is a still further object of the instant invention to provide a single-piece molded plastic trim attachment which secures directly to the lug nuts of a motor vehicle wheel.

It is a still further object of the instant invention to provide a lightweight plastic trim attachment which minimizes rotational energy losses in the motor vehicle drive train.

BRIEF DESCRIPTION OF THE DRAWINGS

FIG. 2 is a full sectional view of a trim attachment according to the instant invention taken along line 2—2 of FIG. 1;

FIG. 3 is a fragmentary sectional view of the instant invention and a single lug bolt and nut of a motor vehicle wheel taken along line 3—3 of FIG. 2;

FIG. 4 is a fragmentary perspective view of a retention member of a trim attachment according to the instant invention;

DESCRIPTION OF THE PREFERRED EMBODIMENT

Figure 1:
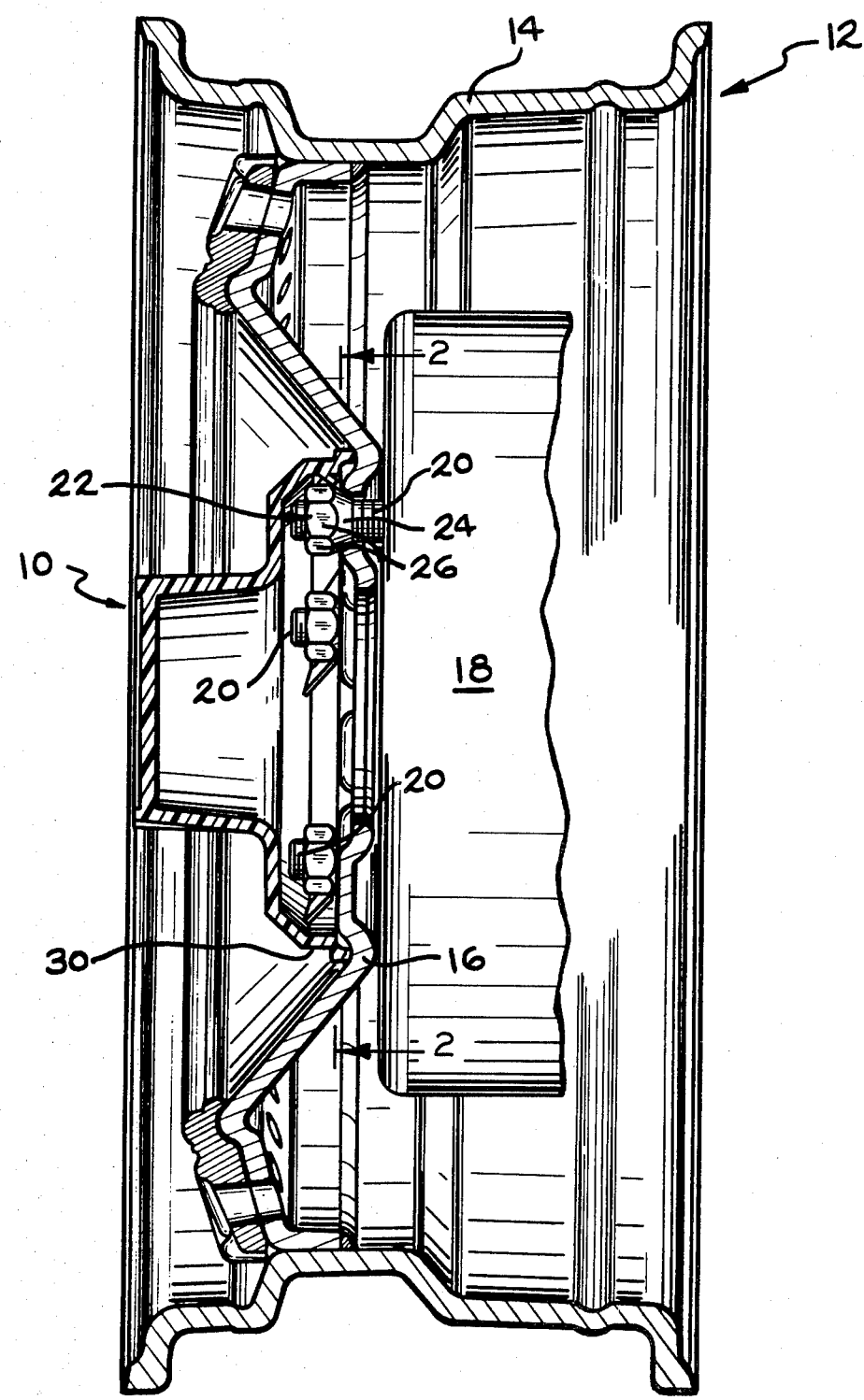
FIG. 1 is a full sectional view of a motor vehicle wheel with a trim attachment according to the instant invention attached thereto.

Referring now to FIG. 1, a wheel trim attachment according to the instant invention is generally designated by the reference numeral 10. The trim attachment 10 is illustrated in position on a conventional motor vehicle wheel 12 which comprises an outer annular rim 14 and generally radially disposed spider 16. The spider 16 is secured about its periphery to the rim 14 by welding or other suitable attachment means. A motor vehicle (not shown) to which the wheel 12 is attached includes a hub 18 having a plurality of axially extending, parallel threaded lug bolts 20. A like plurality of complementarily threaded lug nuts 22 are disposed upon the lug bolts 20, tightened down and thereby secure the motor vehicle wheel 12 to the hub 18 in a conventional manner. The lug nuts 22 each include a frusto-conical surface 24 and a plurality (generally six) of adjacent, aligned flats 26.

The wheel trim attachment 10 may define any sculptured aesthetic design having spokes, reentrant portions or numerous circumferential channels, chamfers or trim rings. Generally, however, at least a peripheral portion 30 will be circular in order to structurally abut and aesthetically blend with the spider 16.

Referring now to FIG. 2, the peripheral portion 30 of the wheel trim attachment 10 is seen to include a plurality of retention members 32. The retention members 32 are equally spaced about the wheel trim attachment 10 in a pattern coinciding with the bolt circle arrangement of the threaded lug bolts 20. Commonly, five retention members 32 will be spaced at 72° intervals about the wheel trim attachment 10 in alignment with the five equally spaced threaded lug bolts 20 of a conventional hub 18. It should be understood that a particular relative circumferential spacing of the retention members 32 is not itself significant. Rather, it is significant that the circumferential spacing of the members 32 coincide with that of the lug bolts 20. Thus, they may be disposed about the peripheral portion 30 of the trim attachment 10 in, for example, 90° intervals to align with a hub 18 having four threaded lug bolts 20 or any other circumferential spacing of threaded lug bolts 20, even or uneven, and any number of such lug bolts.

Referring to FIG. 2 and FIG. 3, lug nut 22 is illustrated in its normal secured torqued-down position against spider 16 of wheel 12 leaving a portion of the lug nut frusto-conical surface 24 exposed and engaging the conical surface 36 of retention member 32. Retention of the wheel trim attachment 10 to vehicle wheel 12 is accomplished by the existance of interference forces within the wheel trim attachment structure extending between the lug nut frusto-conical surface 24 and engagement interface of the annular abutment ring 37 with spider 16.

Referring again to FIG. 2, it should be apparent from the disposition of the frusto-conical surfaces 24 of the lug nuts 22 that these surfaces 24 conjunctively define a reference frusto-conical reference band 34 which is tangent with the radially outermost portion of the frusto-conical surfaces 24 and which tapers toward the hub 18.

Referring now to FIG. 4, one of the plurality of retention members 32 is illustrated. The retention member 32 includes a conical surface 36. The conical surface 36 is generally disposed at an angle equal to the angle of the frusto-conical surface 24 of the lug nuts 22. Whereas the surfaces 24 of the lug nuts 22 may be considered to define male or external cones, the conical surfaces 36 of the retention members 32 define complementary female or internal cones. Relative to the center of the trim attachment 10, the radially outermost axial line on each of the surfaces 36 conjunctively define a frusto-conical reference band substantially identical to the frusto-conical reference band 34 and coincident therewith when the trim attachment 10 is in place on the wheel 12 as illustrated in FIG. 2. At one end of each conical surface 36 as viewed in FIG. 4, the retention member 32 defines an inwardly directed terminus 40. Adjacent the opposite end of the retention member 32 is an inwardly directed, resilient camming surface or boss 42. The retention member 32 is terminated adjacent the boss 42 by a generally triangular, free-standing tab 44. As is illustrated in FIG. 2, the retention members 32 are disposed about the wheel trim attachment 10 with the termini 40 and tabs 44 uniformly disposed. Preferably, the the tabs 44 are positioned as shown in FIG. 2 such that the conventional practice of clockwise rotation to assemble (attach the wheel trim 10 to the motor vehicle wheel 12) and counter-clockwise rotation to disassemble, is observed.

As previously explained, the trim attachment 10 is preferably fabricated of ABS or similar lightweight, high-strength plastic. So fabricated, it may be desirable to include bracing ribs 38 to support and strengthen the retention members 32. It should be understood, however, that the members 32 may be fabricated of metal or other appropriate material according to the instant disclosure and secured to the trim attachment 10 by appropriate bonding or fastening means.

Figure 5:
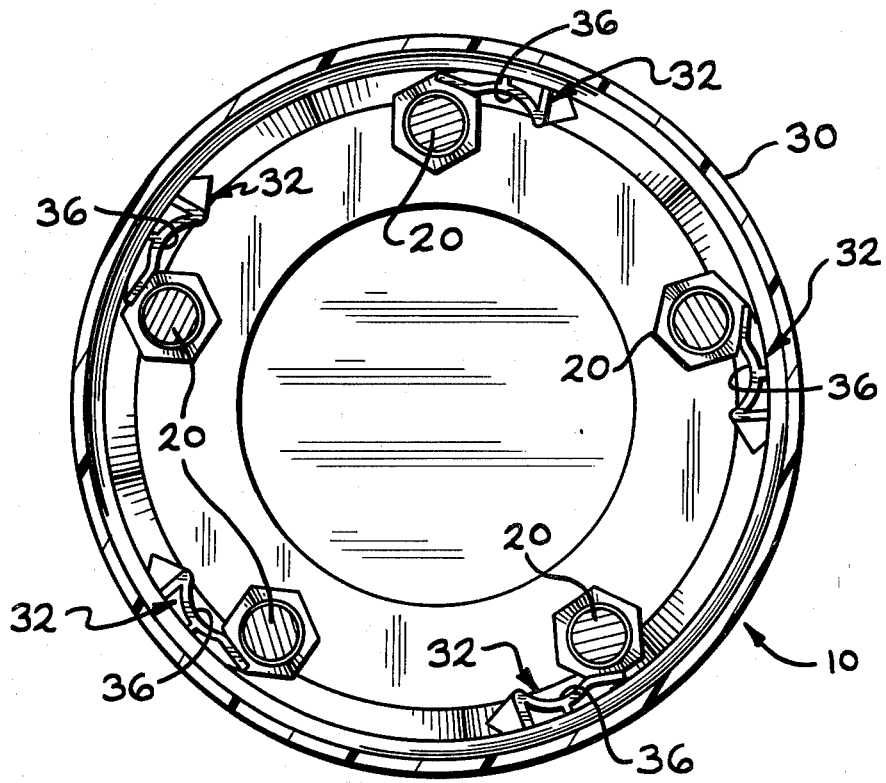
FIG. 5 is a full sectional view of a trim attachment according to the instant invention in pre-installation position on a motor vehicle wheel taken along line 2—2 of FIG. 1.
Figure 6:
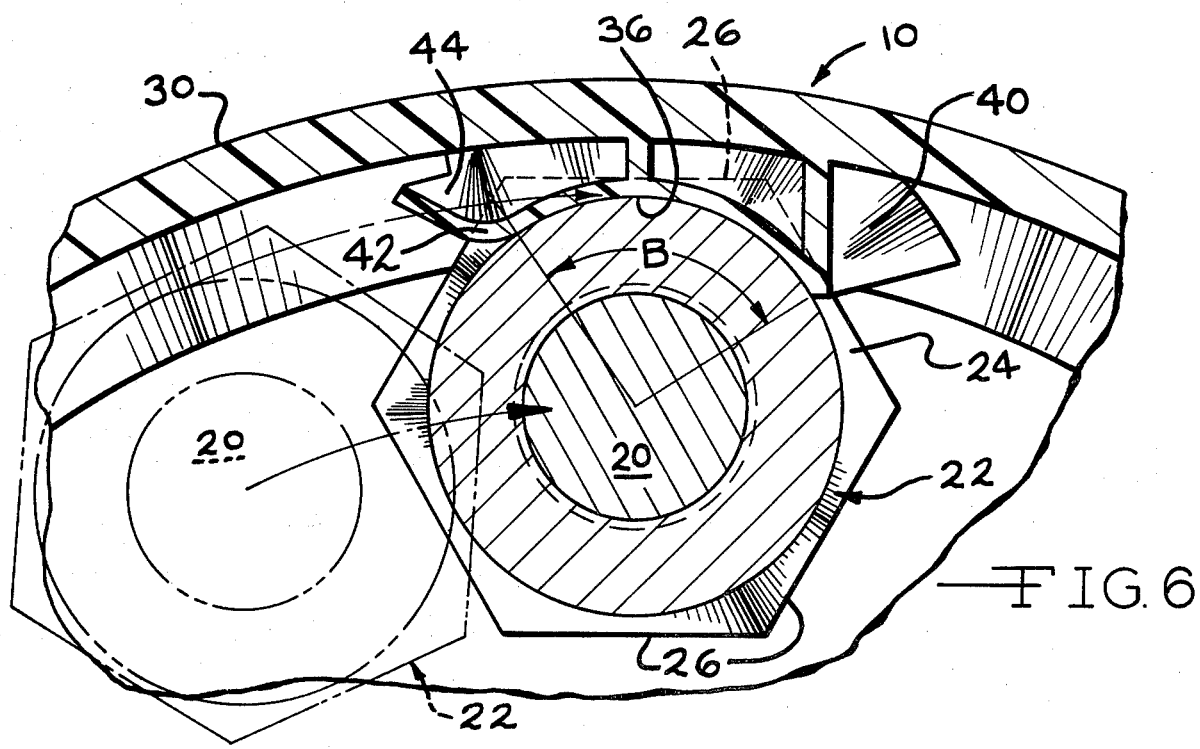
FIG. 6 is a fragmentary full sectional view of a single retention member of the trim attachment according to the instant invention and a lug nut and bolt taken along line 6—6 of FIG. 3.

Referring now to FIGS. 5 and 6, the installation of the wheel trim attachment 10 according to the instant invention will be briefly described. The wheel attachment 10 is positioned adjacent the motor vehicle wheel 12 with their axes coincident. Annular abutment ring 37 (FIG. 3) serves to initially position tabs 44 of retention members 32 for proper engagement with the lug nut frusto-conical surface 24. Clockwise rotation of the wheel trim attachment 10 relative to the motor vehicle wheel 12 will allow the tabs 44 to locate and engage the frusto-conical surfaces 24 of the lug nuts 22. Such initial engagement is illustrated in FIG. 5. Secure engagement and retention of the wheel trim attachment 10 is accomplished by additional rotation, as illustrated in FIG. 6, wherein the frusto-conical surfaces 24 of the lug nuts 22 deflect the resilient bosses 42 such that the frusto-conical surfaces 24 align with and engage the conical surfaces 36 of the retention members 32 thereby creating compressive or interference forces between the lug nut frusto-conical surface 24 and the annular abutment ring 37 (FIG. 3). When properly installed, the wheel trim attachment and motor vehicle wheel appear as is illustrated in FIGS. 1 and 2. Removal of the wheel trim attachment 10 is, of course, straightforward and requires merely the application of counter-clockwise force on the wheel trim attachment 10 relative to the motor vehicle wheel 12.

It is preferred that angle of engagement B, between the lug nut frusto-conical surfaces 24 and the conical surface 36, of retention member 32 lie within the range of 60 to 120 degrees.

When assembled to the wheel 12, the edge of the peripheral portion 30 of the trim attachment 10 engages the surface of the spider 16. This engagement provides axial location of the trim attachment 10 relative to the wheel 12 and insures rigid retention thereon.

The foregoing disclosure is the best mode devised by the inventor for practicing this invention. It is apparent, however, that methods incorporating modifications and variations to the instant invention will be obvious to one skilled in the art of wheel trim attachments. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What I claim is:

1. A trim attachment for a motor vehicle wheel having a plurality of wheel fasteners, such fasteners disposed about a circle and each defining a first frusto-conical surface, such first frusto-conical surfaces conjunctively defining a first frusto-conical reference band, said trim attachment having a plurality of retention means for engaging said first frusto-conical surfaces, each of said retention means comprising a second frusto-conical surface, at least a portion of said second frusto-conical surfaces conjunctively defining a second frusto-conical reference band substantially identical to said first frusto-conical reference band, said retention means each further including a stop means at one end of said second frusto-conical surface for abutting said wheel fasteners and a resilient boss means disposed at the other end of said second frusto-conical surface for retaining said trim on said wheel fastener.

2. The trim attachment of claim 1 wherein said retention means further includes a resilient tab means secured along one edge to said boss means for guiding said first and second frusto-conical surfaces into engagement during installation of said trim attachment of such wheel.

3. The trim attachment of claim 2 wherein said tab means is triangular.

4. The trim attachment of claim 1 wherein said trim attachment includes a peripheral circular wall portion means for mounting said plurality of retention means.

5. The trim attachment of claim 2 wherein said tab means includes at least two edges which intersect to define at least one corner, said corner being more proximate said circular wall than said edge secured to said boss means is to said circular wall.

6. A device for attachment to a wheel secured to a vehicle by a plurality of threaded fasteners each defining an external conical surface, said device including a plurality of retention members each defining an internal conical surface complementary to said external conical surface, a stop means disposed at one end of each of said retention members for contacting said threaded fasteners and inhibiting unidirectional relative rotation between said wheel and said attachment, a resilient boss disposed at the opposite end of each of said retention members and free-standing tab means secured along one edge to said boss for achieving pre-installation juxtaposition of said internal and external conical surfaces.

7. The device of claim 6 wherein said bosses conjunctively define a circle of smaller diameter than a circle conjunctively defined by said internal conical surfaces at corresponding axial positions.

8. The device of claim 6, further including a peripheral wall portion having an inner surface to which said retention members are secured.

9. The trim attachment of claim 8 wherein said tab means includes at least two edges which intersect to define at least one corner, said corner being more proximate said peripheral wall portion than said edge secured to said boss means is to said peripheral wall portion.

10. A trim attachment for a motor vehicle wheel having a plurality of threaded wheel fasteners, each of said fasteners defining a first axis and a first conical surface disposed at a first angle with respect to said first axis, said trim attachment defining a second axis and having a plurality of retention means for engaging said first conical surfaces, each of said retention means including a second conical surface disposed at a second angle with respect to said second axis substantially equal to said first angle, a stop means at one end of said second conical surface for abutting said threaded wheel fastener, a resilient camming means disposed at the other end of said second conical surface for retaining said trim on said wheel fasteners and a resilient tab means secured along one edge to said camming means for guiding said first and second conical surfaces into engagement during installation of said trim on such motor vehicle wheel.

11. A trim attachment for a motor vehicle wheel having a plurality of wheel fasteners, such fasteners disposed about a circle and each defining a first frusto-conical surface, such first frusto-conical surfaces conjunctively defining a first frusto-conical reference band, said trim attachment having a plurality of retention means for engaging said first frusto-conical surfaces, each of said retention means comprising a second frusto-conical surface, at least a portion of said second frusto-conical surfaces conjunctively defining a second frusto-conical reference band substantially identical to said first frusto-conical reference band, said retention means each further including a resilient boss means for retaining said trim on said wheel fastener and a resilient tab means secured along one edge to said boss means for guiding said first and second frusto-conical surfaces into engagement during installation of said trim attachment on such wheel.

* * * * *